(12) United States Patent
Cunningham et al.

(10) Patent No.: US 8,483,934 B2
(45) Date of Patent: Jul. 9, 2013

(54) METHOD FOR PURGING FUEL VAPORS

(75) Inventors: Ralph Wayne Cunningham, Milan, MI (US); Mark Peters, Wolverine Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 561 days.

(21) Appl. No.: 12/838,700

(22) Filed: Jul. 19, 2010

(65) Prior Publication Data
US 2012/0016566 A1 Jan. 19, 2012

(51) Int. Cl.
G06F 19/00 (2011.01)
F02M 33/04 (2006.01)
F02B 33/44 (2006.01)

(52) U.S. Cl.
USPC .......................... 701/103; 123/520; 123/564

(58) Field of Classification Search
USPC ................. 123/518–520, 564, 698; 701/102, 701/103, 110, 113; 60/600, 601
See application file for complete search history.

(56) References Cited

U.S. PATENT DOCUMENTS

| | | | |
|---|---|---|---|
| 5,203,300 A * | 4/1993 | Orzel ........................... | 123/520 |
| 5,979,418 A | 11/1999 | Saruwatari et al. | |
| 6,257,209 B1 | 7/2001 | Hyodo et al. | |
| 6,736,116 B2 * | 5/2004 | Kawano ....................... | 123/520 |
| 6,863,057 B2 * | 3/2005 | Kawano ....................... | 123/518 |
| 6,880,534 B2 | 4/2005 | Yoshiki et al. | |
| 6,910,467 B2 | 6/2005 | Murakami et al. | |
| 6,974,645 B2 * | 12/2005 | Itou et al. ..................... | 429/423 |
| 7,284,541 B1 | 10/2007 | Uchida | |
| 7,775,195 B2 * | 8/2010 | Schondorf et al. ........... | 123/520 |
| 8,104,454 B2 * | 1/2012 | Schondorf et al. ........... | 123/520 |

FOREIGN PATENT DOCUMENTS

JP          59192858 A  * 11/1984 ................... 123/520

* cited by examiner

Primary Examiner — Willis R Wolfe, Jr.
(74) Attorney, Agent, or Firm — Julia Voutyras; Alleman Hall McCoy Russell & Tuttle LLP

(57) ABSTRACT

A method for improving purging of fuel vapors from a boosted engine is presented. In one embodiment, the method increases the efficiency of a venturi that supplies vacuum to purge fuel vapors from a vapor storage canister.

20 Claims, 5 Drawing Sheets

METHOD FOR PURGING FUEL VAPORS

FIELD

The present description relates to a method for improving the purging of fuel vapors from a fuel vapor canister. The method may be particularly useful for purging fuel vapors when intake manifold pressure is higher than a threshold amount.

BACKGROUND AND SUMMARY

One way to increase engine efficiency is to reduce engine displacement and boost the engine. Lowering the engine displacement can reduce engine pumping work and friction, thereby increasing engine efficiency. Further, boosting can increase the engine output so that a smaller boosted engine can produce power that is similar to a larger displacement normally aspirated engine. In this way, engine efficiency can be increased while engine output is maintained.

However, downsizing and boosting an engine can also have drawbacks. For example, it may be more difficult to purge fuel vapors from a fuel vapor storage canister when an engine is boosted by a turbocharger or supercharger. In particular, during some operating conditions intake manifold pressure may be too high to create a desired amount of flow from a fuel vapor canister to the intake manifold. Further, during such conditions, the waste gate of a turbocharger may be at least partially open to limit boost so that the compressor speed does not exceed a threshold speed or so that engine exhaust back pressure is reduced to improve engine pumping efficiency. Thus, during such conditions the flow through the compressor may be relatively low. And, if the intake throttle is closed under such conditions to increase the flow of vapors from the fuel vapor storage canister to the intake system, engine power will be reduced. Thus, engine downsizing and boosting can make it difficult to purge fuel vapors during some conditions.

The inventors herein have recognized the above-mentioned disadvantages and have developed a method for improving purging of fuel vapors from a fuel vapor canister. In one embodiment the present description provides a method for purging fuel vapors, comprising: decreasing a throttle opening area of an engine and increasing an amount of boost produced by a compressor coupled to the engine in response to an increased amount of fuel vapor, for example, an amount of stored fuel vapors exceeding a threshold amount, or a concentration of vapors in the purge flow exceeding a threshold level.

By reducing a throttle opening area and increasing an amount of boost produced by a compressor, vacuum produced via a venturi can be increased to improve flow of fuel vapors from a fuel vapor canister to an engine intake system while a desired level of engine output is maintained. For example, a venturi located in a compressor bypass loop can provide vacuum to draw fuel vapors from a fuel vapor canister to an intake system by using compressed air to create vacuum at the venturi. As boost pressure is increased, the pressure depression created at the venturi also increases, thereby increasing the potential for flow between a fuel vapor canister and the intake system. Further, reducing the throttle opening as the boost pressure increases allows the intake manifold pressure to be maintained at a substantially constant pressure so that the desire engine output can be maintained (e.g., so that the engine air charge is maintained even while the throttle and boost pressure are adjusted).

The present description may provide several advantages. For example, the approach may improve fuel vapor purging for a boosted engine. Further, the approach allows engine output to substantially match a desired engine output even when fuel vapors are being purged. In addition, the approach may limit engine energy consumption by only increasing the venturi efficiency when a stored amount of fuel vapors exceeds a threshold amount.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
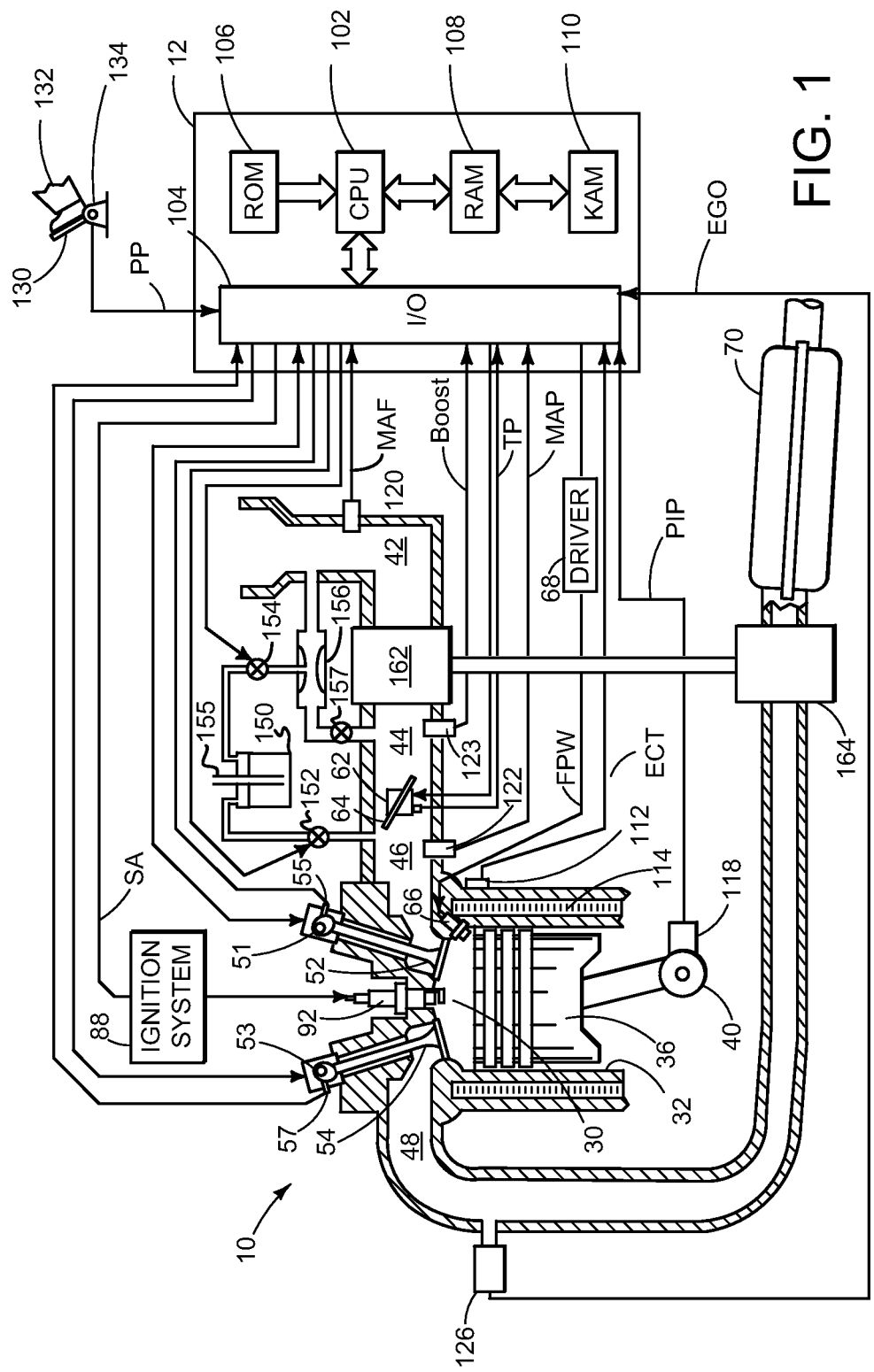
FIG. 1 is a schematic diagram of an engine.

The present description is related to purging fuel vapors from a boosted engine. In one non-limiting example, the engine may be configured as illustrated in FIG. 1 with a turbocharger for boosting the air amount supplied to the engine. In one example, the turbocharged engine system is operated according to the methods of FIGS. 4-5 providing the signals of FIGS. 2-3.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 46 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 46 is shown communicating with optional electronic throttle 62 which adjusts a position of throttle plate 64 to control air flow from intake boost chamber 44. Compressor 162 draws air from air intake 42 to supply intake boost chamber 44. Exhaust gases spin turbine 164 which is coupled to compressor 162. In one example, a low pressure direct injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of turbocharger compressor 164 and catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Fuel vapor canister 150 contains activated carbon or other known media to temporarily store fuel vapors. Fuel vapors may originate from the fuel tank (not shown), the intake manifold, or other point in the fuel system. Canister vacuum control valve 152 controls flow of fuel vapors from fuel vapor canister 150 to intake manifold 46. Fresh air is drawn into fuel vapor canister 150 via vent 155. In some examples, a valve may be positioned along vent 155 to control the flow of fresh air into fuel vapor canister 150. Fuel vapor canister 150 can also purge fuel vapors to air intake 42 via venturi 156. When compressor 162 produces a positive pressure in boost chamber 44, valve 157 can be partially or fully opened or modulated to allow air to flow from boost chamber 44 through venturi 156 and into air intake 42. A pressure drop occurs in venturi 156 creating a low pressure region when air flows through venturi 156 from compressor 162. Lower pressure at venturi 156 induces flow from fuel vapor canister 150 to venturi 156 when canister venturi control valve 154 is at least partially open. The pressure drop at venturi 156 is related to the venturi design and the velocity of air flow through the venturi. In one example, valves 154 and 157 are set to an open state when flow from the fuel vapor canister 150 to the air intake 42 is desired. In other examples, canister vacuum control valve 152 can be opened so that there is flow from canister 150 to intake manifold 46 and air intake 42 while there is or is not flow from fuel vapor canister 150 to venturi 156. For example, when intake manifold pressure is slightly below atmospheric pressure, a small amount of flow to the intake manifold 46 may be generated. At the same time, ventur 156 may draw flow from fuel vapor canister 150.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold absolute pressure (MAP) from pressure sensor 122 coupled to intake manifold 46; a measurement of boost pressure from pressure sensor 123; a measurement of air mass entering the engine from sensor 120; and a measurement of throttle position from a sensor (not shown). Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 46, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for a system for purging fuel vapors, comprising: an engine having a compressor and a throttle, the throttle located in an air intake system downstream of the compressor; a venturi located in the air intake system and in a compressor bypass loop; and a controller, the controller including instructions for reducing a throttle opening area and increasing boost pressure in response to an amount of stored fuel vapors exceeding a threshold amount. The system includes where the controller includes further instructions for increasing the throttle opening area and decreasing boost pressure in response to an amount of stored fuel vapors less than the threshold amount. The system includes where the controller includes further instructions for adjusting spark supplied to the engine during a transition from a first boost pressure to a second boost pressure. The system further comprises a fuel vapor canister, a first conduit running from the fuel vapor canister to the venturi, and a second conduit running from the fuel vapor canister to the air intake system at a location downstream of the throttle. In one example, the system includes where the controller includes further instructions for adjusting a boost pressure to a pressure at which an efficiency of the venturi is greater than a predetermined efficiency. The system further comprises a valve located along the first conduit, the valve regulating flow from the fuel vapor canister to the air intake system. The system also includes where the controller includes further instructions for adjusting a position of the valve to provide a desired flow rate from the fuel vapor canister to the air intake system.

Figure 2:
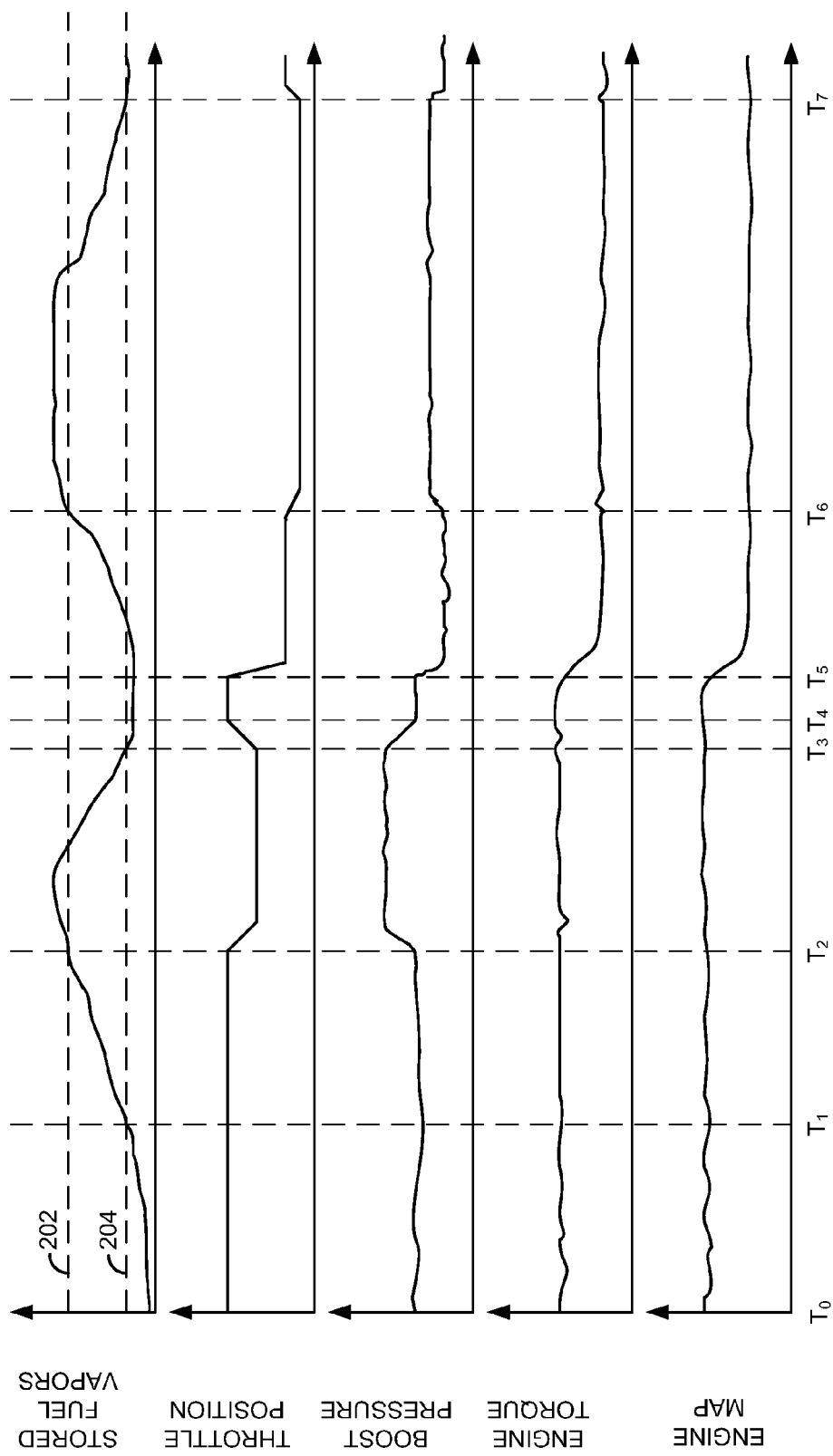
FIG. 2 shows simulated signals of interest for purging a boosted engine.
Figure 3:
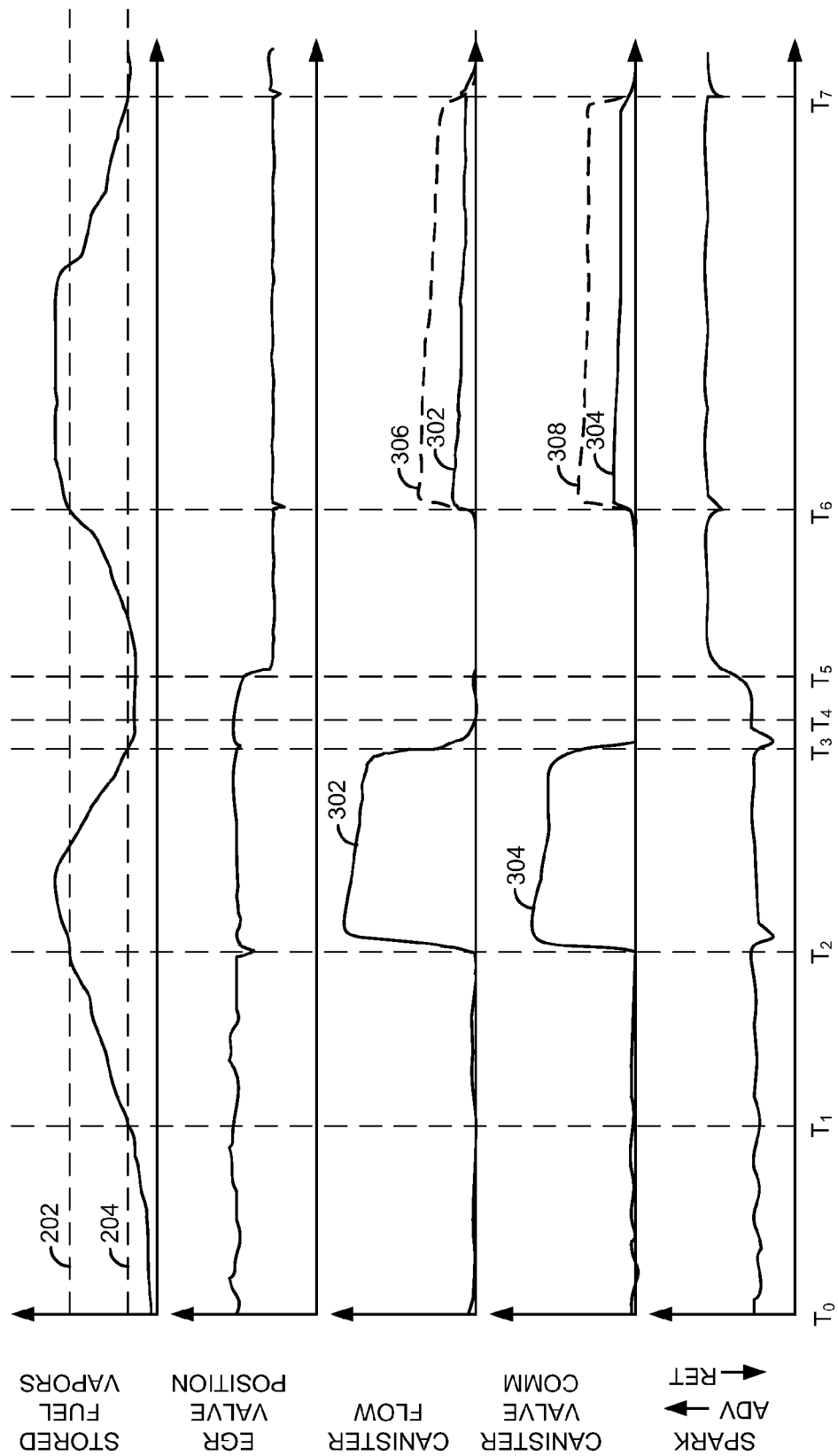
FIG. 3 shows additional simulated signals of interest for purging a boosted engine.

FIG. 2 shows simulated signals of interest for purging a boosted engine. The simulated signals of FIGS. 2-3 are representative for a system as shown in FIG. 1 and the methods described in FIGS. 4-5. FIG. 3 represents other signals of interest during the same time as the signals of FIG. 2.

FIG. 2 shows five plots of different signals, each plot relative to an x-axis that represents time. Along the x-axis, time increases from the right to the left. Vertical markers $T_0$-$T_7$ are used to show artifacts or points of interest for different signals relative to other events in time. The first plot from the top of FIG. 2 represents an amount of fuel vapors stored in a fuel vapor canister (e.g., fuel vapor canister 150 of FIG. 1). The amount of stored fuel vapors increases in the direction of the y-axis arrow. Horizontal marker 202 represents a level of fuel vapors where fuel vapor purging is desired. In some examples, the level at which fuel vapors are purged can vary with operating conditions. Horizontal marker 204 represents a level of fuel vapors where fuel vapor purging is discontinued after a purging sequence begins. The amount of stored fuel vapors may be determined by a sensor or by a model that estimates stored fuel vapors. The second plot from the top of FIG. 2 represents a position of a throttle. The throttle opening increases in the direction of the y-axis arrow. The third plot from the top of FIG. 2 represents boost pressure downstream of a compressor in an intake manifold (e.g., compressor 162 of FIG. 1). Boost pressure increases in the direction of the y-axis arrow. The fourth plot from the top of FIG. 2 represents engine torque during the time of interest. Engine torque increases in the direction of the y-axis arrow. The fifth plot from the top of FIG. 2 represents MAP during the time of interest. Engine MAP increases in the direction of the y-axis arrow.

Figure 4:
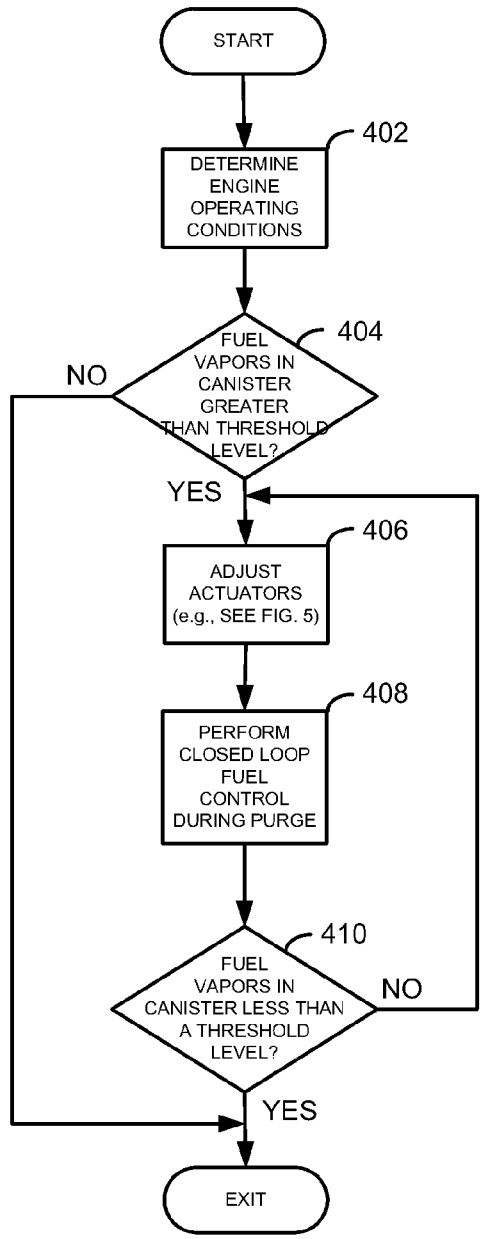
FIG. 4 is an example flowchart of a method for purging a boosted engine.

In FIG. 3, the stored fuel vapor plot of FIG. 2 is reproduced at the top of FIG. 3 so that correlation of FIG. 3 signals to FIG. 2 signals can be improved for the viewer. The second plot from the top of FIG. 3 represents EGR valve position during the sequence. EGR valve opening amount of stored fuel vapors increases in the direction of the y-axis arrow. The third plot from the top of FIG. 3 represents flow from a fuel vapor canister (e.g., fuel vapor canister 150 of FIG. 1) during the sequence. Fuel canister flow increases in the direction of the y-axis arrow. Curve 302 represents flow from the fuel vapor canister to a venturi (e.g., ventur 156 of FIG. 1) while curve 306 represents flow from the fuel vapor canister to the intake manifold (e.g., 46 of FIG. 1). The fourth plot from the top of FIG. 4 represents canister valve position commands during the sequence. The fuel canister valve position opening command increases in the direction of the y-axis arrow. Curve 304 represents the command of the canister venturi control valve (e.g., valve 155 of FIG. 1) controlling flow from the fuel vapor canister to a venturi while curve 308 represents a command of the canister vacuum control valve (e.g., 152 of FIG. 1) for controlling flow from the fuel vapor canister to the intake manifold. The fifth plot from the top of FIG. 3 represents spark during the sequence. The amount of spark advance increases in the direction of the y-axis arrow.

The sequence of FIGS. 2 and 3 starts at time $T_0$ and ends after $T_7$. Between time $T_0$ and $T_1$, the amount of stored fuel vapors begin low but slowly increase. Further, from $T_0$ to $T_5$, engine torque is held substantially constant to more clearly show the actions taken during fuel vapor purging. Throttle position is held substantially constant from $T_0$ to $T_5$ so that engine torque is substantially constant. Boost pressure provided by a compressor coupled to the engine (e.g., compressor 162 of FIG. 1) is also substantially constant from $T_0$ to $T_5$. Engine MAP is also substantially constant as it is related to boost pressure and throttle position.

In FIG. 3, EGR valve position between $T_0$ and $T_1$ is also substantially constant to operate the engine at a desired level of dilution. The fuel vapor canister flow between $T_0$ and $T_1$ is substantially zero while the level of fuel vapors stored in the fuel vapor canister are below the level 202 which represents where fuel vapor purging is desired. The canister valve opening commands are also substantially zero during the time from $T_0$ to $T_1$ so that substantially no flow exists between the fuel vapor canister and the engine. And, since the engine is operating at a substantially constant engine speed and load, the spark advance is held substantially constant.

At time between $T_1$ and $T_2$, the amount of stored fuel vapors continue to increase until the amount of stored fuel vapors reach the level 202 desired for starting the fuel vapor purge process. Other signals remain substantially constant between $T_1$ and $T_2$.

After the amount of stored fuel vapors reach the level 202 desirable for purging, fuel vapors are purged between $T_2$ and $T_3$. Fuel vapors can be purged from the fuel vapor canister via a venturi or via a conduit passing from the fuel vapor canister to the intake manifold. At the illustrated engine operating conditions between $T_2$ and $T_3$, the engine MAP is relatively high so that little if any flow may be introduced from the fuel vapor canister to the intake manifold. Therefore, fuel vapor purging performed between $T_2$ and $T_3$ is accomplished solely via the venturi vapor path.

At $T_2$, the open area of a throttle upstream of the engine intake manifold is reduced. At the same time, boost pressure is increased. In one example, boost pressure is increased by closing a turbocharger waste gate. In another example, boost pressure is increased by adjusting the position of a turbocharger vane. By increasing boost and decreasing the throttle opening area, the amount of air moving from the intake system to the intake manifold may be held substantially constant as indicated by the MAP signal between $T_2$ and $T_3$. Similarly, engine torque is held substantially constant during the time when the throttle opening area is reduced and boost is increased. In one example, the faster actuator may be commanded to follow a position trajectory that is related to a slower actuator command. For example, a throttle actuator may be able to change position faster than waste gate actuator. Therefore, the throttle may be commanded in response to the position of the turbocharger waste gate position. In this way, the faster actuator can move at a rate that limits an air charge disturbance to the engine.

Increasing the boost pressure also increases the potential for flow between the fuel vapor canister and the venturi since the flow from the fuel vapor canister to the venturi is related to the flow of air from the boost chamber (e.g., 44 of FIG. 1) to the intake system (e.g., 42 of FIG. 1). Since the delta pressure across the throttle increases at the same time that the throttle opening area is reduced, substantially constant flow is maintained through the throttle.

Engine EGR amount is also maintained by commanding the EGR valve position to the same position pre and post purging of fuel vapors. However, in some examples, the EGR valve may be at least partially closed briefly during a transition where the throttle opening area is reduced or increased. For example, at $T_2$ and $T_3$ the EGR valve position is decreased to reduce EGR flow. The EGR flow may be briefly reduced during transitions into and out of fuel vapor canister purging so that the possibility of engine misfire is reduced.

The flow of fuel vapors to the canister is shown initially low. The fuel vapor flow is gradually increased to a higher level to support a more rapid reduction in fuel vapors in the fuel canister. In some examples, the initial flow rate may be low until the concentration of fuel vapors in the canister is determined by an oxygen sensor in the exhaust system, for example. The flow from the fuel vapor canister can be increased when the concentration of hydrocarbons in the fuel vapor canister is known. After the fuel vapor flow reaches a high value it is gradually reduced up to the time of $T_3$ where it is rapidly reduced in response to the stored fuel vapors being below threshold 204. The fuel canister flow rate is driven at least in part by the canister venturi control valve command 304. In one example, the canister venturi control valve command 304 represents a desired valve position. In other examples, the canister command 304 represents a duty cycle applied to canister venturi control valve. The canister valve command increases from a low level to a higher level and is then decreased until time $T_3$.

Engine spark is substantially constant from T2 to T3. However, FIG. 3 shows that the spark advance can be retarded while the throttle position and boost are adjusted. In one example, the spark can be advanced or retarded during transitions when the throttle position and boost are adjusted. For example, engine speed or a torque model can be monitored to estimate engine torque while throttle position and boost are adjusted. If the engine speed increases or if the estimated engine torque output increases, spark is retarded. If the engine speed decreases or if the estimated engine torque output decreases, spark is advanced. In this way, engine spark timing can be adjusted to limit torque disturbances that may be related to throttle and boost adjustments.

At the time between $T_3$ and $T_4$, the throttle position and boost level are returned to the levels they assumed prior to $T_2$. Again, throttle position and boost level are coordinated to limit torque disturbances that may be perceivable to an operator. Thus, engine torque and MAP are maintained at substantially constant values. EGR is also maintained at a constant level to control engine emissions and pumping efficiency.

At $T_3$, the fuel vapor canister flow is ramped off as the canister venturi control valve command is ramped to an off position. $T_3$ corresponds to the time when stored fuel vapors in the fuel vapor canister are less than a value where purging is discontinued. Thus, the fuel canister venturi control valve is ramped to a closed position when the fuel vapors stored in the fuel vapor canister are less than a threshold level. Spark is shown being retarded at $T_3$, however, in some examples, spark may be advanced if engine speed or torque is reduced during the throttle and boost transition at $T_3$.

Between time $T_4$ and $T_5$ the engine is operated at the operating conditions similar to operating conditions between $T_0$ and $T_1$. Further, the stored fuel vapors are lower than the level at which fuel vapors are stored so no command is issued to the canister venturi control valve.

At $T_5$, engine torque is reduced to meet a lower operator torque demand. The engine torque is reduced by decreasing the throttle opening amount and by decreasing the boost pressure. The MAP also is decreased, EGR flow is reduced, and the spark is advanced to reflect the change in engine operating conditions. The amount of stored fuel vapors gradually increase between $T_5$ and $T_6$ until the amount of stored fuel vapors reach threshold 202 at $T_6$.

At $T_6$, the throttle opening area is reduced, the boost is increased, the EGR amount is substantially maintained at the pre-purge level (e.g., before time $T_6$), and commands are issued to the canister vacuum control valve and the canister venturi control valve. Thus, vapors flow from the fuel vapor canister to the intake manifold and to the engine intake. This mode of operation is desirable when there is intake manifold vacuum, but where the intake manifold vacuum may be insufficient to flow a desired amount of fuel vapors from the fuel vapor canister to the engine.

During the time between $T_6$ and $T_7$, the command to the canister vacuum control valve 308 is increased to a level that allows flow from the fuel vapor canister to the intake manifold. Likewise, the command to the canister venturi control valve 304 is increased, but to a level that is less than the level shown between time $T_2$ and $T_3$. Since the engine is operating at a lower desired torque, it may be desirable to flow fuel vapors at a lower rate as compared to the level of vapors flowing between $T_2$ and $T_3$. The flow rate from the fuel vapor canister to the intake manifold is shown higher than the flow rate from the fuel vapor canister to the air intake. However, under some operating conditions when fuel vapors are flowing from the fuel vapor canister to the intake manifold and the air intake, the flow to the air intake is higher than the flow to the intake manifold.

Engine torque, spark, and MAP are substantially maintained at the level they assumed prior to $T_6$. But, like the transitions at $T_2$ and $T_3$, spark timing and EGR can be adjusted during transitions of throttle and boost to compensate for torque increases or decreases that may occur during the transition. In addition, the canister venturi control valve and canister vacuum valve commands are ramped to zero at $T_7$ when the stored amount of fuel vapors is less than a threshold level 204 where purging is desired.

Referring now to FIG. 4, an example flowchart of a method for purging fuel vapors from a boosted engine is shown. The method of FIG. 4 is applicable to the system of FIG. 1 and it operates in some examples according to FIGS. 2-3.

At 402, routine 400 determines engine operating conditions. Engine operating conditions may include but are not limited to engine coolant temperature, engine temperature, an amount of stored fuel vapors, boost level, MAP, engine speed, engine temperature, throttle position, engine torque, engine air flow for desired torque, and spark advance. Routine 400 proceeds to 404 after engine operating conditions are determined.

At 404, routine 400 judges whether or not an amount of fuel vapors stored in the fuel vapor storage canister is greater than a predetermined amount. In some examples, the predetermined amount may vary depending on operating conditions. For example, if ambient temperatures are relatively high, the level of fuel vapors to initiate fuel vapor purging may be lower than the level of fuel vapors to initiate fuel vapor purging at lower ambient temperatures. If an amount of stored fuel vapors is greater than a threshold amount, routine 400 proceeds to 406. Otherwise, routine 400 proceeds to exit.

At 406, routine 400 adjust actuators to initiate purging of fuel vapors for a boosted engine. If a desired level of flow from a fuel vapor canister to the intake manifold is possible during the present operating conditions, routine 400 at least partially opens a canister vacuum control valve placed along a conduit that links the fuel vapor canister to the intake manifold. On the other hand, if there is sufficient vacuum in the intake manifold to induce flow from the fuel vapor storage canister to the intake manifold, but the flow level that is less than desired, fuel vapors may be drawn to the air intake via a venturi that provides a vacuum to draw fuel vapors from the fuel vapor storage canister to the venturi. If there is insufficient vacuum in the intake manifold to induce flow from the fuel vapor storage canister to the intake manifold during the present operating conditions routine 400 at least partially closes an opening area of a throttle located downstream of a compressor in the intake path while simultaneously increasing boost pressure.

In one example, EGR valve position, canister vacuum control valve position, canister venturi control valve position, throttle position, turbocharger waste gate or vane position, and spark advance are adjusted to provide a desired level of fuel vapors from the fuel vapor storage canister to the engine. In other examples, a fewer or greater number of actuators may be adjusted to provide the desired level of fuel vapors to the engine. In one example, actuators are adjusted according to the method of FIG. 5. Routine 400 proceeds to 408 after actuators are adjusted.

At 408, routine 400 performs closed loop fuel control during purging of the fuel vapor storage canister. In one example, timing of fuel injectors is adjusted in response to an amount of fuel vapors flowing to the engine via the fuel vapor storage canister. In particular, if the amount of fuel vapors introduced to the engine via the fuel vapor storage canister indicates an engine air-fuel ratio that is richer than desired, the fuel injection pulse width is decreased to move the engine air-fuel ratio to a leaner value. On the other hand, if the amount of fuel vapors introduced to the engine via the fuel vapor storage canister indicates an engine air-fuel ratio that is leaner than desired, the fuel injection pulse width is increased to move the engine air-fuel ratio to a richer value. In one example, the engine air-fuel ratio is indicated by an oxygen sensor. Thus, the fuel injection timing is adjusted in response to an oxygen sensor. In this way, the desired engine air-fuel ratio is maintained while fuel vapors are purged from a fuel vapor storage canister to the engine.

At 410, routine 400 judges whether or not the fuel vapors stored in the fuel vapor storage canister are less than a threshold. In one example, hydrocarbon sensors may be placed in a conduits leading from the fuel vapor storage canister to the intake manifold and the air intake. If the concentration of hydrocarbons sensed by either hydrocarbon sensor is less than a threshold level, it may be determined that the amount of hydrocarbons stored in the fuel vapor storage canister is less than a threshold amount. In other examples, the amount of hydrocarbons flowing into the engine from the fuel vapors storage container can be determined from oxygen sensor feedback. In particular, the canister based hydrocarbons can be determined from the amount of air entering the engine, the amount of fuel injected to the engine, and the exhaust gas oxygen concentration level. If routine 400 judges that an amount of fuel vapors stored in the fuel vapor storage canister is less than a threshold level, routine 400 proceeds to exit. Otherwise, routine 400 returns to 406 and continues purging fuel vapors from the fuel vapor storage canister.

Figure 5:
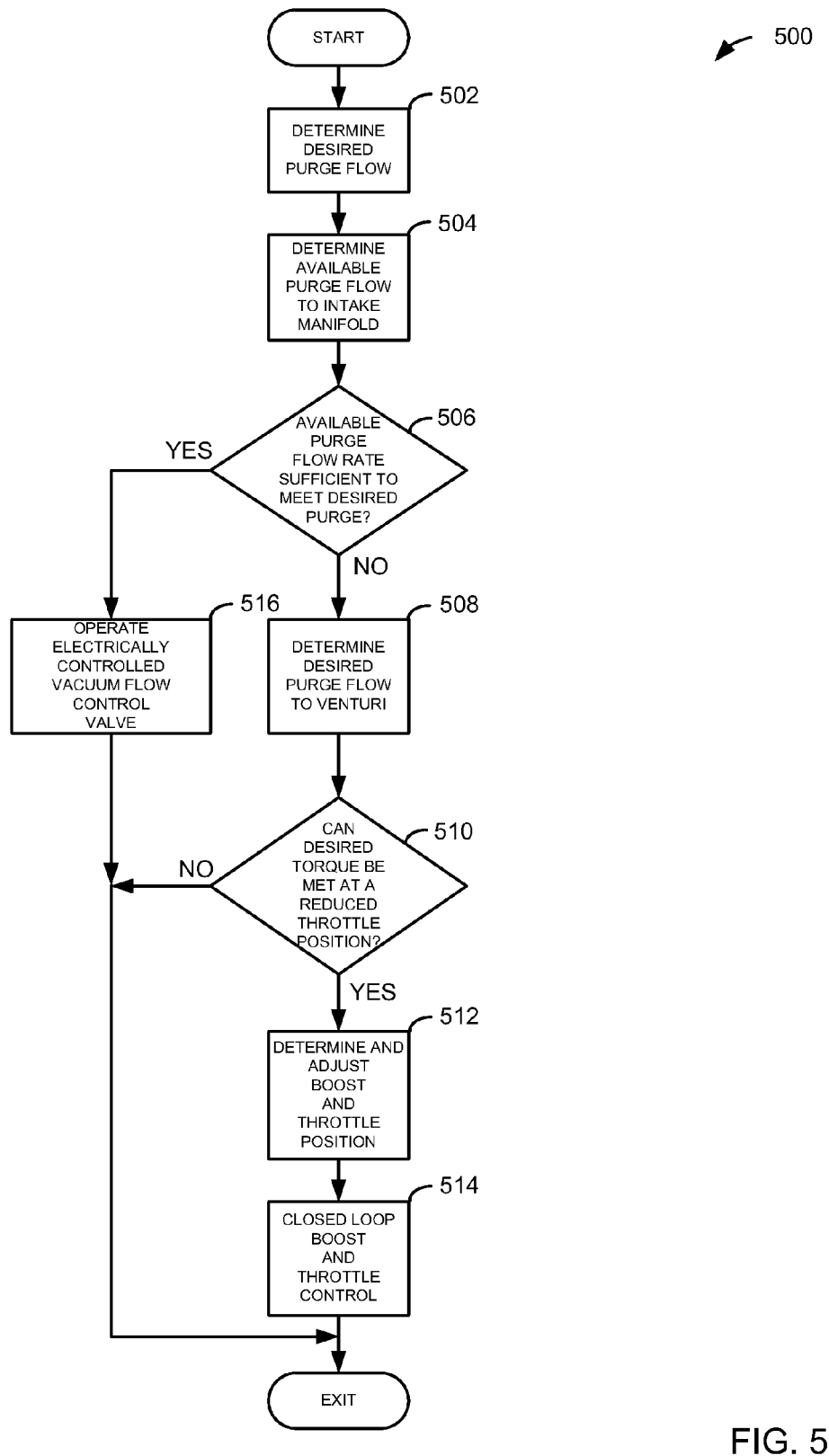
FIG. 5 is an example flowchart of a method for adjusting actuators during purging of fuel vapors from a fuel vapor storage canister of a boosted engine.

Referring now to FIG. 5 an example flowchart of a method for adjusting actuators during purging of fuel vapors from a fuel vapor storage canister of a boosted engine is shown. At 502, routine 500 determines the desired fuel vapor flow rate from the fuel vapor storage canister to the engine. In one example, the desired fuel flow rate is based on engine speed and load and a desired fuel vapor canister purge time. In particular, engine speed and load are used to index a table of empirically determined vapor flow rates that can purge the fuel vapor canister of fuel vapors in a prescribed amount of time. In some examples, the fuel vapor flow rate may be limited based on a fraction of engine fuel to be provided by fuel vapors. For example, it may be desirable under some conditions to limit the portion of engine fuel delivered via the fuel vapor canister to be less than 35% of the total amount of fuel to be delivered to the engine. Of course, the amount of fuel the vapor canister vapors delivers to the engine can vary depending on engine operating conditions. Routine 500 proceeds to 504 after the desired flow rate from the fuel vapor storage canister to the engine is determined.

At 504, routine 500 determines the available flow rate of fuel vapors from the fuel vapor storage canister to the engine via the vacuum path (e.g., from the fuel vapor storage canister to the intake manifold). In one example, routine 500 determines the available purge flow rate from the fuel vapor storage canister to the intake manifold via the vacuum path from the pressure difference between atmospheric pressure and intake manifold pressure. In particular, for a given pressure drop, the available flow rate from the fuel vapor storage canister to the intake manifold can be determined by looking up empirically determined flow data that is stored in a table of function and indexed according to the pressure drop from atmospheric pressure to intake manifold pressure. Routine 500 proceeds to 504 after the available flow rate from the fuel vapor storage canister to the intake manifold via the vacuum path is determined.

At 506, routine 500 judges whether or not the available flow rate from the fuel vapor storage canister to the intake manifold via the vacuum path is sufficient to meet the desired purge rate. In one example, if the available flow rate of fuel vapors from the fuel vapor storage canister to the intake manifold via the vacuum path is greater than the desired fuel vapor flow rate from the fuel vapor storage canister to the engine, routine 500 proceeds to 516. Otherwise, routine 500 proceeds to 508.

At 508, routine 500 determines the desired purge flow rate from the fuel vapor storage canister to the engine via the canister venturi (e.g., ventur 156 of FIG. 1). In one example, the available flow rate of fuel vapors from the fuel vapor storage canister to the intake manifold via the vacuum path is subtracted from the fuel vapor flow rate which is desired from the fuel vapor storage canister to the engine. The remainder, if any, is the desired flow rate from the fuel vapor storage canister to the engine via the venturi. During some conditions (e.g., when the available flow rate from the fuel vapor storage canister to the intake manifold is less than a threshold amount), the fuel vapor path from the fuel vapor canister to the engine intake manifold may be closed so that all fuel vapors from the fuel vapor storage canister are routed to the air intake via the venturi. Routine 500 proceeds to 510 after the desired flow rate of fuel vapors from the fuel vapor storage canister to the engine via the venturi is determined.

At 510, routine 500 judges whether or not the driver demand torque or desired torque can be met at a reduced throttle position. For example, if the operator requests full engine torque it may be determined that the engine should operate at full throttle with a specified level of boost. On the other hand, if the engine is operated at a part load condition, it may be possible to provide an equivalent amount of engine torque when the throttle opening area is reduced. In one example, routine 500 judges that the desired engine torque can be met at a reduced throttle opening area when a boost level can be increased such that the flow through the throttle after boost is increased and throttle opening area decreased is equivalent to the flow through the throttle before the throttle opening area is reduced. Thus, if boost pressure is increased, the flow through the throttle can be maintained at a desired level so that engine MAP and torque remain substantially constant by reducing the throttle opening area. If routine 500 judges that the desired engine torque can be met at a reduced throttle opening area, routine 500 proceeds to 512. Otherwise, routine 500 proceeds to exit. In this way, routine 500 limits the purging of fuel vapors from the fuel vapor storage canister under some conditions At 512, routine 500 determines an adjustment to boost pressure and throttle position. In one example, the boost pressure is adjusted based on a pressure differential across the venturi that provides the desired purge flow rate from the fuel vapor storage canister to the engine via the canister venturi. In particular, the boost pressure is set to a level that provides a desired flow rate from the fuel vapor canister to the venturi based on a difference between atmospheric pressure and boost pressure in the boost chamber. However, if the venturi can provide the desired amount of fuel vapor flow from the fuel vapor canister to the air intake at the present boost pressure, then turbocharger waste gate position or vane position may be adjusted in response the air flow from the boost chamber to the venturi. By adjusting the waste gate position or the vane position, flow to the engine via the throttle may be maintained at the present throttle position by maintaining the same boost pressure even though some flow is directed through the venturi. In an example where it is desirable to increase boost pressure to increase flow from the fuel vapor canister to the air intake, the throttle opening area can be reduced to maintain engine torque during purging of fuel vapors from the fuel vapor canister to the engine air intake. Further, the engine boost can be increased by at least partially closing the waste or adjusting the vane position of a turbocharger.

Thus, if the venturi can provide the desired amount of fuel vapor flow from the canister at the present boost level, the boost level is maintained at the present level. If the present boost level is capable of providing a fuel vapor flow rate from the canister at a rate that is higher than the desired fuel vapor flow rate from the fuel vapor storage canister to the engine via the venturi, then the desired fuel flow rate from the canister can be provided by adjusting the position of the canister venturi control valve. For example, if the boost level is increased from a first level to a second level, the desired fuel vapor flow rate can be maintained by partially closing or reducing the opening time of the canister venturi control valve. If the boost level is decreased from a first level to a second level, the desired fuel vapor flow rate can be maintained by partially opening or increasing the opening time of the canister venturi control valve.

On the other hand, if the present boost level cannot provide the desired fuel vapor flow rate from the fuel vapor storage canister to the engine via the venturi, then the boost pressure and throttle can be adjusted to provide the desired engine torque and the desired fuel vapor flow rate. For example, if it is desirable to flow fuel vapors from the fuel vapor canister to the air intake, vapor flow from the canister to the air intake can be induced by closing the throttle, increasing boost, opening valves that limit pressurized air flow from an engine compressor to the venturi and into the engine air intake, and opening valves that limit flow from the fuel vapor storage canister to the venturi. The throttle position is adjusted according to a throttle model such that the throttle provides substantially the same amount of air prior to the fuel vapor purge cycle as during the fuel vapor purge cycle. In one example, a function or table can be indexed by a pressure drop across the throttle and a desired throttle flow rate to determine the desired throttle position. In one example, the desired throttle flow rate is determined from a table or function that relates a driver torque demand and engine speed to an engine air flow rate. Thus, when the boost pressure is increased to provide a desired flow rate from the canister to the venturi, the throttle is closed so that engine torque is maintained. During conditions where the driver torque demand changes, the throttle is adjusted to a position that provides the desired torque at the present boost pressure. In this way, driver torque demand can be met while a desired flow rate from the canister to the venturi is met.

In some examples, where it may take an undesirable amount of time to achieve a desired level of boost, boost may be set to a level higher than is required by the venturi valve to achieve the desired fuel vapor flow rate from the fuel vapor storage canister to the engine. During such conditions, the fuel vapor flow rate from the canister to the venturi can be adjusted by changing the position or opening timing of the canister venturi control valve. Thus, if less flow from the canister to the venturi is desired, the canister vacuum control valve can be at least partially closed or the opening time of the canister vacuum control valve can be reduced.

In some examples, the method of FIG. 5 also adjust EGR valve position and spark timing during fuel vapor purging of a fuel vapor canister. In one example, EGR flow through an EGR valve may be reduced during the time throttle position and boost are adjusted. In one example, the amount of EGR provided to the engine is reduced during a portion of the time the throttle and boost are transitioning. In another embodiment, cam timing can be adjusted to reduce internal EGR during throttle and boost transitions. Likewise, spark advance can be adjusted during transitions of throttle position and boost. For example, spark can be retarded if engine speed or torque increase during throttle and boost transitions. If engine speed or torque decrease during throttle and boost transitions, spark may be advanced.

Since a portion of the desired flow rate from the canister to the venturi may be provided by way of a conduit coupling the intake manifold and canister, operation of the electrically actuated vacuum control valve is described. In one example, an electrically actuated vacuum control valve regulates flow between the fuel vapor canister and the intake manifold. By supplying the valve with a varying duty cycle electrical voltage, it is possible to vary the amount of fuel vapor flow from the canister to the intake manifold. In one example, the duty cycle of the canister vacuum control valve is set according to the available flow rate of fuel vapors from the fuel vapor storage canister to the intake manifold and the intake manifold pressure. (e.g., MAP). In particular, the valve duty cycle is adjusted according to a function that describes a relationship between valve duty cycle, the pressure drop across the valve, and the available flow rate. Routine 500 proceeds to exit after the engine throttle, boost, and canister flow control valves are adjusted.

At 516, routine 500 operates an electrically controlled canister vacuum control valve to provide the desired fuel vapor flow rate from the fuel vapor storage canister to the engine. As described above, the position or opening time of the canister vacuum control valve is related to the pressure drop across the valve and the desired fuel vapor flow rate. In one example, where the desired fuel vapor flow rate is constant and the pressure drop across the canister vacuum control valve increases, the canister vacuum control valve opening timing is reduced. Alternatively, the opening area of the vacuum control valve can be reduced. The desired valve position can be determined based on a table or function that describes the flow rate through the valve as a function of valve position and pressure drop across the valve. The table or function can be indexed by the desired fuel vapor flow rate and the pressure drop across the valve to provide a valve position command. Routine 500 proceeds to exit after the canister vacuum control valve is adjusted.

Thus, the methods of FIG. 4-5 provide for a method for purging fuel vapors, comprising: decreasing a throttle opening area of an engine and increasing an amount of boost produced by a compressor coupled to the engine in response to an amount of stored fuel vapors exceeding a threshold amount. The method further comprises introducing fuel vapors into an intake system upstream of a throttle, and where the compressor is upstream of throttle. The method also includes where the engine produces an amount of torque that is substantially equivalent to a driver demand torque while the throttle opening area is decreased. The method also includes where an amount of fuel vapors entering the engine via a canister is increased while the throttle opening area is decreased. The method also includes where a position of an EGR valve is substantially maintained while the throttle opening area is decreased. The method further comprises adjusting spark timing while the throttle opening area is decreasing. In one example, the method includes where the throttle opening area is decreased when a pressure in an intake manifold of an engine is greater than a threshold amount.

The methods of FIGS. 4-5 also provide for a method for purging fuel vapors, comprising: operating an engine with a first throttle opening area and a first amount of boost in response to a desired engine torque while an amount of stored fuel vapors is less than a threshold amount; and operating the engine with a second throttle opening area and a second amount of boost at the desired engine torque while an amount of stored fuel vapors exceeds the threshold amount, the second throttle opening area less than the first throttle opening area, the second amount of boost greater than the first amount of boost. The method includes where a pressure in an intake manifold of the engine is substantially a same pressure as when a throttle is positioned to provide the first throttle opening area and when the throttle is position to provide the second throttle opening area. The method includes where a duty cycle of a valve is increased to increase a flow of hydrocarbons from a canister while the engine is operated with the second throttle opening area. In one example, the method includes where the engine produces an amount of torque that is substantially equivalent to a driver demand torque while a throttle opening area is the second throttle opening area. The method also includes where the amount of stored fuel vapors are stored in a carbon canister, and where a position of an EGR valve is substantially in a same position while the engine is operated at the first throttle opening area and while the engine is operated at the second throttle opening area. The method also includes where a pressure in an intake manifold of the engine is substantially constant while the engine is transitioned between operating with the first throttle opening area and with the second throttle opening area.

As will be appreciated by one of ordinary skill in the art, routines described in FIGS. 4-5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for purging fuel vapors, comprising:
   decreasing a throttle opening area of an engine and increasing an amount of boost produced by a compressor coupled to the engine in response to an amount of stored fuel vapors exceeding a threshold amount.

2. The method of claim 1 further comprising introducing fuel vapors into an intake system upstream of a throttle, and where the compressor is upstream of throttle.

3. The method of claim 1 where the engine produces an amount of torque that is substantially equivalent to a driver demand torque while the throttle opening area is decreased.

4. The method of claim 1 where an amount of fuel vapors entering the engine via a canister is increased while the throttle opening area is decreased.

5. The method of claim 1 where a position of an EGR valve is substantially maintained while the throttle opening area is decreased.

6. The method of claim 1 further comprising adjusting spark timing while the throttle opening area is decreasing.

7. The method of claim 1 where the throttle opening area is decreased when a pressure in an intake manifold of an engine is greater than a threshold amount.

8. A method for purging fuel vapors, comprising:
   operating an engine with a first throttle opening area and a first amount of boost in response to a desired engine torque while an amount of stored fuel vapors is less than a threshold amount; and
   operating the engine with a second throttle opening area and a second amount of boost at the desired engine torque while an amount of stored fuel vapors exceeds the threshold amount, the second throttle opening area less than the first throttle opening area, the second amount of boost greater than the first amount of boost.

9. The method of claim 8 where a pressure in an intake manifold of the engine is substantially a same pressure as when a throttle is positioned to provide the first throttle opening area and when the throttle is position to provide the second throttle opening area.

10. The method of claim 8 where a duty cycle of a valve is increased to increase a flow of hydrocarbons from a canister while the engine is operated with the second throttle opening area.

11. The method of claim 8 where the engine produces an amount of torque that is substantially equivalent to a driver demand torque while a throttle opening area is the second throttle opening area.

12. The method of claim 8 where the amount of stored fuel vapors are stored in a carbon canister, and where a position of an EGR valve is substantially in a same position while the engine is operated at the first throttle opening area and while the engine is operated at the second throttle opening area.

13. The method of claim 8 where a pressure in an intake manifold of the engine is substantially constant while the engine is transitioned between operating with the first throttle opening area and with the second throttle opening area.

14. A system for purging fuel vapors, comprising:
   an engine having a compressor and a throttle, the throttle located in an air intake system downstream of the compressor;
   a venturi located in the air intake system and in a compressor bypass loop; and a controller, the controller including instructions for reducing a throttle opening area and increasing boost pressure in response to an amount of stored fuel vapors exceeding a threshold amount.

15. The system of claim 14 where the controller includes further instructions for increasing the throttle opening area and decreasing boost pressure in response to an amount of stored fuel vapors less than the threshold amount.

16. The system of claim 15 where the controller includes further instructions for adjusting spark supplied to the engine during a transition from a first boost pressure to a second boost pressure.

17. The system of claim 14 further comprising a fuel vapor canister, a first conduit running from the fuel vapor canister to the venturi, and a second conduit running from the fuel vapor canister to the air intake system at a location downstream of the throttle.

18. The system of claim 17 where the controller includes further instructions for adjusting a boost pressure to a pressure at which an efficiency of the venturi is greater than a predetermined efficiency.

19. The system of claim 18 further comprising a valve located along the first conduit, the valve regulating flow from the fuel vapor canister to the air intake system.

20. The system of claim 19 where the controller includes further instructions for adjusting a position of the valve to provide a desired flow rate from the fuel vapor canister to the air intake system.

\* \* \* \* \*